(No Model.)
W. S. HARMON.
MOLE TRAP.
No. 254,963. Patented Mar. 14, 1882.
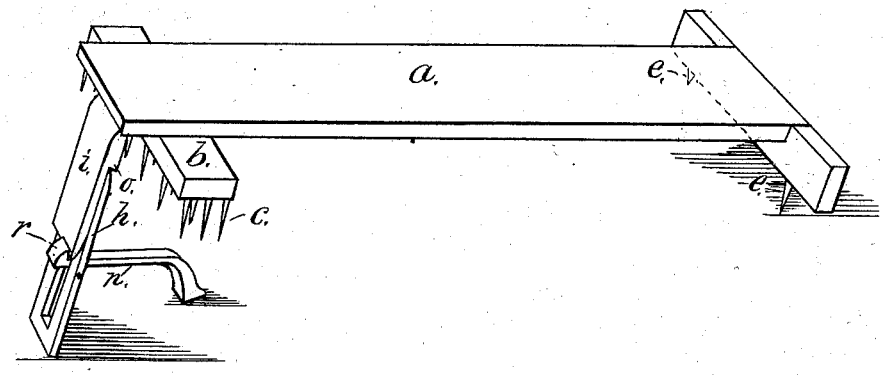
WITNESSES:
O. Hood.
Wm H Daggett
INVENTOR:
William S. Harmon,
By H. P. Hood.
Atty.

UNITED STATES PATENT OFFICE.

WILLIAM S. HARMON, OF OWENSVILLE, INDIANA.

MOLE-TRAP.

SPECIFICATION forming part of Letters Patent No. 254,963, dated March 14, 1882.

Application filed January 9, 1882. (No model.)

*To all whom it may concern:*

Be it known that I, WILLIAM S. HARMON, of Owensville, in the county of Gibson and State Indiana, have invented a new and useful Improvement in Mole-Traps, of which the following is a specification, having reference to the accompanying drawing.

My invention relates to that class of mole-traps which impale the mole in his burrow; and it has for its object to produce a trap that may be cheaply made and effective in its operation.

My invention consists in the construction and combination of the various parts, as hereinafter described.

The accompanying drawing represents a perspective view of my invention, in which—

$a$ is a piece of stout plank, having the cross-bar $b$ secured near one end. Cross-bar $b$ is a narrow strip of wood having numerous sharp spikes or spears, $c$, driven into it. The rear end of $a$ is provided with two short legs, $e\ e$, the object of which is to raise it slightly and to keep it from slipping backward when the trap is set. The end of the fall provided with the legs $e\ e$ rests upon the ground, and the other end is supported above the burrow of the mole by the prop $h\ i$. Said prop is composed of two pieces—$h$, having a mortise near its lower end, in which is pivoted the trigger $n$, and $i$, which has a shoulder, $o$, which rests on the top of $h$. The top end of $h$ is slightly beveled, and the upper end of $i$ is beveled in the opposite direction, as shown, so that when $h$ and $i$ are placed together upright under the end of $a$ the corner of $h$ engages $i$ at the bottom or inner edge of the shoulder $o$, while the load rests on the outer edge of $i$, the effect being to cause the prop to double together and fall. This is prevented when the trap is set by the catch $r$ on the trigger $n$, which catch hooks over the lower end of $i$ and holds $h$ and $i$ together. The trigger $n$ bends downward, as shown, the end being formed into a broad foot, which rests on the burrow of the mole.

The operation of my device is obvious. The mole, passing along his burrow, finds a depressed place under the foot of the trigger $n$, and seeking to raise it, the catch $r$ is drawn away from $i$ and the prop collapses and falls, and the spikes $c$ enter the burrow, impaling the mole.

I am aware of the patent to T. Brannan, July 21, 1874, No. 153,235, and I do not claim anything therein shown; but,

I claim as my invention—

The combination, with the trigger $n$, pivoted to the bar $h$, and the bar $i$, supported on the top of the bar $h$ by a notch near its upper end and retained in position by the trigger $n$, of the fall $a$, the armed end of which rests upon the top of $i$, substantially as described.

WILLIAM S. HARMON.

Witnesses:
F. W. HALL,
WILLIAM SCOTT.